United States Patent
Ahn et al.

(10) Patent No.: US 9,996,887 B2
(45) Date of Patent: Jun. 12, 2018

(54) SYSTEM FOR PROVIDING AUTHORING SERVICE AND USER TERMINAL FOR PROVIDING AUTHORING SERVICE

(75) Inventors: Heejung Ahn, Yongin-si (KR); Suerynn Roh, Seoul (KR); Jihong Lee, Seoul (KR); Hyuckjin Im, Seongnam-si (KR); Jaeseok Jang, Seoul (KR)

(73) Assignee: KT Corporation, Seongnam-si (KR)

( * ) Notice: Subject to any disclaimer, the term of this patent is extended or adjusted under 35 U.S.C. 154(b) by 850 days.

(21) Appl. No.: 14/126,633

(22) PCT Filed: Jul. 13, 2011

(86) PCT No.: PCT/KR2011/005139
§ 371 (c)(1),
(2), (4) Date: Dec. 16, 2013

(87) PCT Pub. No.: WO2012/173302
PCT Pub. Date: Dec. 20, 2012

(65) Prior Publication Data
US 2014/0114869 A1     Apr. 24, 2014

(30) Foreign Application Priority Data
Jun. 16, 2011 (KR) .................. 10-2011-0058607

(51) Int. Cl.
*G06F 21/10* (2013.01)
*G06Q 50/18* (2012.01)
*G06Q 10/00* (2012.01)

(52) U.S. Cl.
CPC ......... *G06Q 50/184* (2013.01); *G06F 21/105* (2013.01); *G06Q 10/00* (2013.01)

(58) Field of Classification Search
CPC ..... G06Q 50/184; G06Q 10/00; G06F 21/105
See application file for complete search history.

(56) References Cited

U.S. PATENT DOCUMENTS 7,073,073 B1 *  7/2006  Nonaka ............... G06F 21/10
                                                 380/277
9,087,179 B1 *  7/2015  Ansari ................. G06F 21/10
(Continued)

FOREIGN PATENT DOCUMENTS

JP       2006-178547 A      7/2006
KR    10-2006-0087102 A     8/2006
(Continued)

OTHER PUBLICATIONS

International Search Report of PCT/KR2011/005139 dated May 29, 2012.

*Primary Examiner* — Meng Li
(74) *Attorney, Agent, or Firm* — Sughrue Mion, PLLC (57) ABSTRACT

An authoring service system which includes an authoring service controller providing an authoring tool to a user terminal and receiving self-made digital content generated using the authoring tool from the user terminal, a license manager managing license information for each digital content and registering the license information related to the self-made digital content based on information received from the user terminal, and a content provisioner providing the self-made digital content based the license information. In this case, the authoring service system may provide an authoring service by linking to an in-app module installed in the user terminal. In addition, the authoring service system may provide a resale service for the self-made digital content by managing a license.

12 Claims, 10 Drawing Sheets

(56) References Cited

U.S. PATENT DOCUMENTS

| | | | | |
|---|---|---|---|---|
| 2005/0097368 A1* | 5/2005 | Peinado | ............... | G06F 21/10 |
| | | | | 726/4 |
| 2006/0167803 A1* | 7/2006 | Aydar | ............... | G06F 21/10 |
| | | | | 705/51 |
| 2008/0109369 A1* | 5/2008 | Su | ............... | G06Q 10/06 |
| | | | | 705/59 |
| 2008/0120240 A1* | 5/2008 | Ginter | ............... | G06F 21/10 |
| | | | | 705/51 |
| 2009/0132403 A1* | 5/2009 | Titus | ............... | G06Q 10/04 |
| | | | | 705/311 |
| 2011/0016182 A1* | 1/2011 | Harris | ............... | G06Q 30/02 |
| | | | | 709/206 |
| 2011/0072159 A1* | 3/2011 | Kim | ............... | G06F 21/10 |
| | | | | 709/246 |
| 2012/0303491 A1* | 11/2012 | Hill | ............... | G06Q 30/06 |
| | | | | 705/27.2 |

FOREIGN PATENT DOCUMENTS

| | | | |
|---|---|---|---|
| KR | 10-2007-0015488 A | | 2/2007 |
| KR | 10-2007-0109565 A | | 11/2007 |
| KR | 10-2008-0044598 A | | 5/2008 |
| KR | 10-2009-0059242 A | | 6/2009 |
| KR | 10-2010-0020091 A | | 2/2010 |
| KR | 10-2010-0048723 A | | 5/2010 |
| KR | 10-2010-0107796 A | | 10/2010 |

\* cited by examiner

FIG. 7

SYSTEM FOR PROVIDING AUTHORING SERVICE AND USER TERMINAL FOR PROVIDING AUTHORING SERVICE

CROSS-REFERENCE TO RELATED APPLICATION

This application is a National State entry of Internation Application No. PCT/KR2011/005139 filed on Jul. 13, 2011, which claims the benefit of priority from Korean Patent Application No. 10-2011-0058607 filed on Jun. 16, 2011 in the Korean Intellectual Property Office. The entire disclosures of these applications are incorporated herein by reference in their entirety.

BACKGROUND

1. Field

Exemplary embodiments broadly relate to an authoring service system and a user terminal for providing the authoring service.

2. Description of the Related Art

At the early stages of internet service, content produced by a service provider was generally provided to a user. Recently, however, the use of content that is directly produced by the user in the internet service has increased.

If the main purpose of the early internet environment was to search for and obtain good quality information quickly and precisely what was requested, the internet environment today has to provide multimedia-based entertainment and varied information in accordance with the propagation of digital devices and the development of data transmission technology.

However, this results in the unauthorized use of self-made contents.

In addition, only the self-made contents according to the related art are posted on the Internet, and trade through separate distribution channels has not been activated.

The above information disclosed in this Background section is only for enhancement of understanding of the background and therefore it may contain information that does not form prior art that is already known in this country to a person of ordinary skill in the art.

SUMMARY

It is an aspect to provide an authoring service system and a user terminal for providing an authoring service that provides an environment in which transactions of various digital-contents authoring including resale of content can be made.

Further, it is an aspect to provide an authoring service system and a user terminal for providing the authoring service by linking to an in-app module installed in the user terminal.

According to an aspect of an exemplary embodiment, the authoring service system includes an authoring service controller configured to provide an authoring tool to a user terminal and configured to receive self-made digital content generated using the authoring tool from the user terminal; a license manager configured to manage license information for each digital content and configured to register the license information related to the self-made digital content based on information received from the user terminal; and a content provisioner configured to provision the self-made digital content based on the license information acquired from the license manager.

Another exemplary embodiment provides a user terminal, which includes: a transmitter and receiver configured to transmit and receive the data and configured to execute a multimedia content, an in-app module in which a component is inserted in an unspecified number of applications accessing an authoring service system through a network to receive an authoring tool and configured to generate self-made digital content using the authoring tool; and a terminal agent mounted in operating systems (OS) to be automatically driven when rebooting a user terminal. The terminal agent is used as a user interface for executing the in-app module.

According to an aspect of an exemplary embodiment, the in-app module that is installed in the user terminal only needs to drive without accessing a website that is running the web browser or a separate online market, thereby making it possible to provide a user-friendly environment capable of authoring the digital content and then registering for the sale of the authored digital content. In addition, an environment capable of reselling by processing the digital content is provided.

Further, in order to protect both the copyright of the original author of the digital content and the copyright of the processor of the digital content, the authoring digital content expresses both equity of the original author and equity of the processor.

BRIEF DESCRIPTION OF THE DRAWINGS

The above and/or other exemplary aspects will become more readily apparent from the following description of exemplary embodiments, taken in conjunction with accompanying drawings, in which.

DETAILED DESCRIPTION OF EXEMPLARY EMBODIMENTS

In the following detailed description, only certain exemplary embodiments have been shown and described, simply by way of an illustration. As those skilled in the art would realize, the described exemplary embodiments may be modified in various different ways, all without departing from the spirit or scope of an inventive concept. Accordingly, the drawings and description are to be regarded as illustrative in nature and not as restrictive. Like reference numerals designate analogous elements throughout the specification.

In addition, throughout the specification, unless explicitly described to the contrary, the word "comprise" and variations such as "comprises" or "comprising" will be understood to imply the inclusion of stated elements but not the exclusion of any other elements.

In addition, the words "unit" and "module", described in the specification means a unit of processing at least one function or operation, and may be implemented by hardware or software or a combination of hardware and software. In an exemplary embodiment, a unit may denote an element configured to implement at least one function or operation.

Hereinafter, an authoring service system and a user terminal for providing the authoring service according to an exemplary embodiment will be described with reference to the accompanying drawing.

Figure 1:
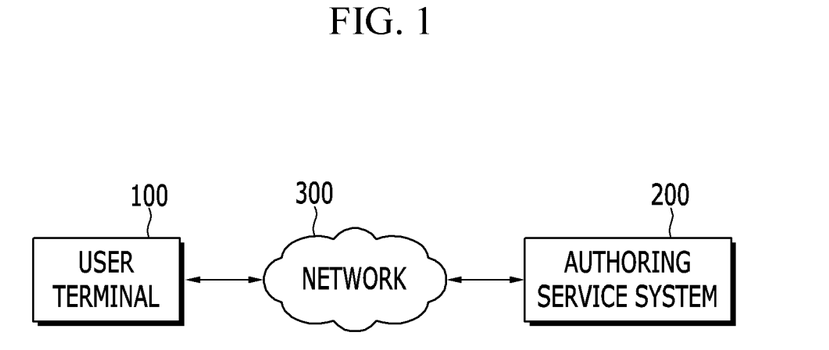
FIG. 1 is a schematic diagram illustrating a network providing an authoring service according to an exemplary embodiment.

FIG. 1 is a schematic diagram illustrating a network providing an authoring service according to an exemplary embodiment.

Referring to FIG. 1, a user terminal 100 and an authoring service system 200 are connected through a network 300.

In an exemplary embodiment, the network 300 provides a connection path so that the user terminal 100 may access the authoring service system 200. Here, the network 300 may be a wire communication network such as the internet when the user terminal 100 is a wire terminal, and may be a wireless communication network such as a mobile communication network when the user terminal 100 is a mobile terminal.

The user terminal 100, which is a terminal connected to the authoring service system 200, in order to use an authoring service, includes both a public user terminal and a developer terminal.

In an exemplary embodiment, the user terminal 100 is configured to transmit and receive data by accessing the network 300, and includes all terminals configured to store and execute digital content. The user terminal 100 is provided with an in-app module 101 installed therein, and may include terminals configured to access the network 300, and for example, may be a smart TV, a smart phone, or a tablet terminal. The smart TV refers to a TV configured to install various applications produced by third-party vendors or developers and configured to transmit/receive data through the network 300. In addition, the tablet terminal refers to, for example, an iPad, a Galaxy Tab, or the like.

The authoring service system 200 provides an interface environment for enabling the user terminal 100 to register the digital content to be resold, create the digital content using the authoring tool, sell self-made digital content, or purchase digital content created by others.

In this case, the digital content is defined to include an application, as a form in which multimedia constituent elements such as text, images, sound, video, animation, and the like are controlled and defining a behavior or an interaction combining each of the constituent elements.

The authoring service system 200 may provide the authoring service in connection with the in-app module 101 (see FIG. 2) equipped with a specific application installed in the user terminal 100. In that case, if the user terminal 100 executes only the in-app module 101 (see FIG. 2) without the need to access the website by running a web browser, the authoring service may be provided.

At this time, the in-app is an application providing a common service in a form in which a component is inserted in an unspecified number of applications. In this case, the application may be a web application that is executed on the web to enter a uniform resource locator (URL) of a web page, or may be a native application that is downloaded and executed in the terminal itself.

Hereinafter, a detailed configuration of the user terminal 100 and the authoring service system 200 will be described with reference to FIG. 2 and FIG. 3.

Figure 2:
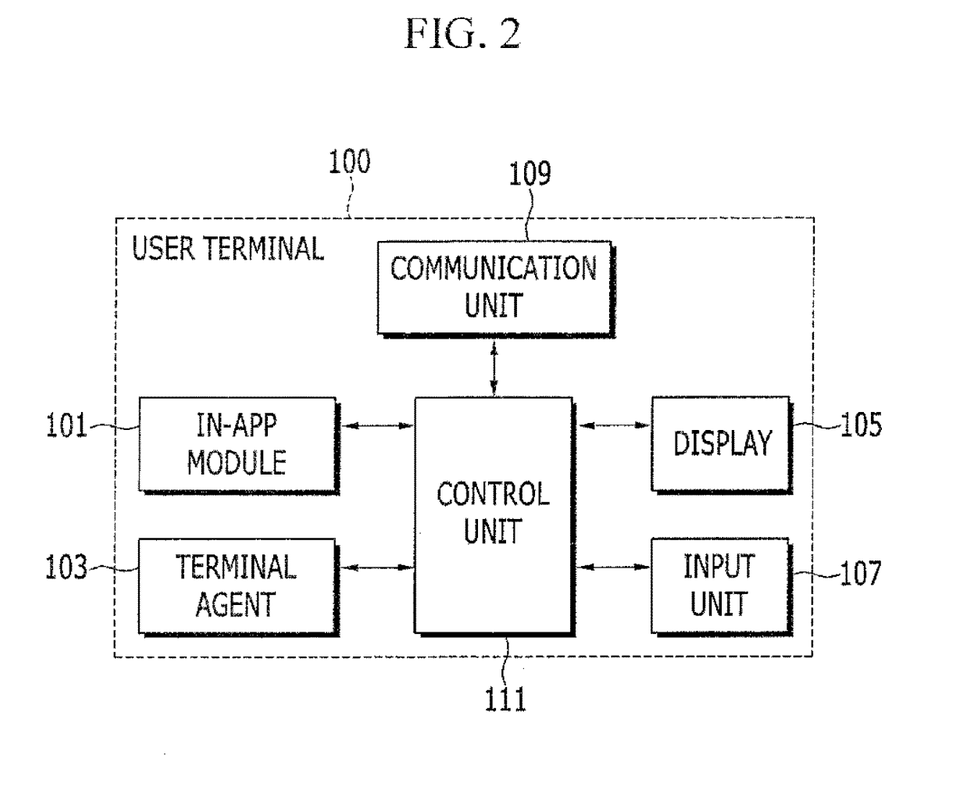
FIG. 2 is a block diagram showing a detailed configuration of a user terminal according to an exemplary embodiment.

FIG. 2 is a block diagram showing a detailed configuration of a user terminal according to an exemplary embodiment.

Referring to FIG. 2, the user terminal 100 includes the in-app module 101, a terminal agent 103, a display 105, an input unit 107 such as an input interface, a communication unit 109 such as a transmitter/receiver, and a control unit 111 such as a controller.

Although the in-app module 101 is shown as a separate constituent element, the in-app module 101 is provided in a form of an open application programming interface (API) to application developers as a configuration equipped with a specific application, such that the in-app module 101 may be equipped with an application.

The in-app module 101 has a form in which a component is inserted in an unspecified number of applications, and performs a series of processes that receive the authoring tool accessing the authoring service system 200 through the network 300 and creates self-made digital content using the authoring tool to register to the authoring service system 200.

The terminal agent 103 is automatically driven at the time of booting of the user terminal 100, and acts as a user interface for executing the in-app module 101.

Here, the terminal agent 103, which is a software agent equipped with an operating system (OS) (not shown) of the user terminal 100 and is locally executed, is automatically installed when the specific application equipped with the in-app module 101 is installed.

The terminal agent 103 may provide an authoring service menu to a terminal menu of the user terminal 100. The authoring service menu may be configured to include a resale content upload item, an authoring service item, and a self-made content trade item. If one of these items is selected, the terminal agent 103 may execute the in-app module 101.

The display 105 outputs various information according to the operation of the user terminal 100 on a screen.

The input unit 107 is a means for the user to input information or select information that is output to the display 105.

The communication unit 109 is connected to the network 300 to provide a path for transmitting and receiving data.

The control unit 111 is a constituent element performing the general operations of the terminal according to the OS of the user terminal 100, and is connected with the in-app module 101, the terminal agent 103, the display 105, the input unit 107, and the communication unit 109 to control a linkage operation between the constituent elements.

Figure 3:
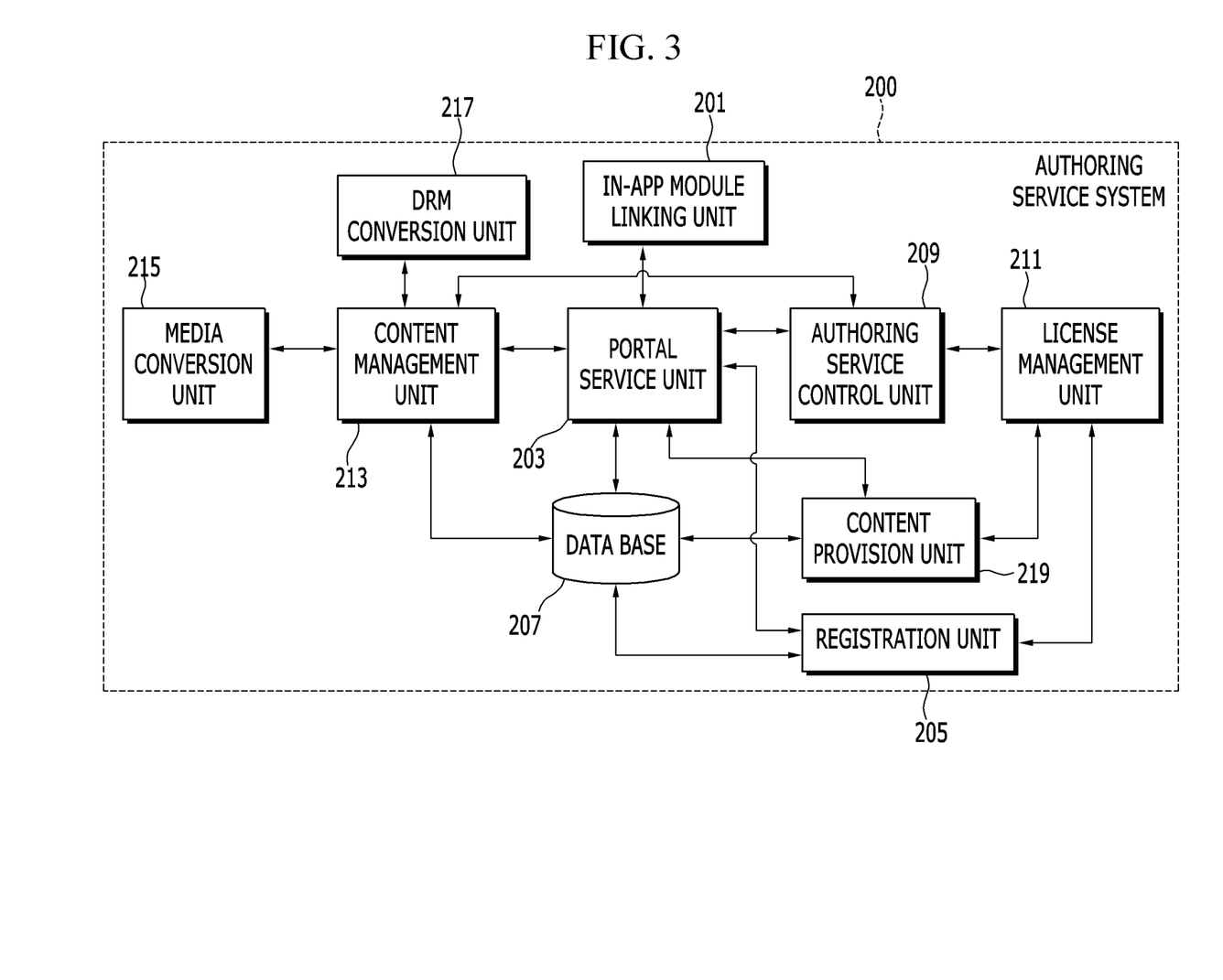
FIG. 3 is a block diagram showing a configuration of an authoring service system according to an exemplary embodiment.

FIG. 3 is a block diagram showing a configuration of an authoring service system according to an exemplary embodiment.

Referring to FIG. 3, the authoring service system 200 includes an in-app module linking unit 201, a portal service unit 203, a registration unit 205, a database 207, an authoring service control unit 209 such as a controller, a license management unit 211 such as a license manager, a content management unit 213 such as a content manager, a media conversion unit 215 such as a media converter, a DRM conversion unit 217 such as a DRM converter, and a content provision unit 219.

Here, each constituent element is indicated in a function block form within a single device, but is implemented in a separate server form and may be connected through a private protocol or internal network.

Hereafter, each constituent element will be described.

The in-app module linking unit 201 is connected to the in-app module 101 according to a connection request of the in-app module 101 of FIG. 1 in an exemplary embodiment. The in-app module linking unit 201 receives the authoring service request from the in-app module 101 to transfer to the portal service unit 203. The portal service unit 203 transmits the data generated or transferred by performing the process according to each request to the in-app module 101.

The in-app module linking unit 201 is connected with the portal service unit 203 and the portal service unit 203 is implemented so as to be connected with the registration unit 205, the database 207, the authoring service control unit 209, the license management unit 211, the content management unit 213, the media conversion unit 215, the DRM conversion unit 217, and the content provision unit 219 in the drawing, but the in-app module linking unit 201 may be directly connected with the registration unit 205, the database 207, the authoring service control unit 209, the license management unit 211, the content management unit 213, the media conversion unit 215, the DRM conversion unit 217, and the content provision unit 219.

The portal service unit 203 uploads the resale content to the user terminal 100, searches and selects the digital content of the author target, generates and registers the self-made digital content using the authoring tool, and provides the user interface for trading the self-made digital content. The portal service unit 203 may provide a limited service to the user terminal 100 in which the in-app module 101 is installed. In addition, the portal service unit 203 may be implemented in a form of a portal site that the general internet user may use as well as the user terminal 100 in which the in-app module 101 is installed.

The portal service unit 203 may include a user interface module (not shown) providing a portal page interface capable of uploading the resale content, searching and selecting the digital content of the author target, and searching and trading the self-made digital content, and a transmission/reception module (not shown) transmitting the information received through the portal page interface to the corresponding constituent element of the authoring service system 200 or receiving the information to be output through the portal page interface from the corresponding constituent element. In this case, the user interface module may include a template provider providing a service area division tool of the portal page, and a placing tool provider providing a placing tool of a service to be displayed in the service area of the portal page.

The registration unit 205 receives the digital content to be resold from the user terminal 100 and confirms the licensing information for the digital content to be resold from the license management unit 211, and when the digital content is a resalable digital content, the digital content is stored in the database 207.

The registration unit 205 searches the database 207 to determine whether the digital content to be resold is registered in advance, and when the digital content is not registered, acquires the licensing information on the digital content to be resold. Further, the registration unit 205 registers the acquired licensing information to the license management unit 211 and then determines whether the digital content is resold.

The database 207 stores the digital content of the author target and the self-made digital content as a number of contents according to various kinds of digital content. At this time, the digital content of the author target includes the resale content uploaded from the user terminal 100 and the digital content that a number of unspecified users are allowed free use of the copyright.

The authoring service control unit 209 provides the authoring tool to the user terminal 100 and receives the self-made digital content created using the authoring tool from the user terminal 100.

The authoring tool, which is software used in authorship, is used to combine multimedia constituent elements with each other. The authoring tool is software generating the data of the multimedia form combining a picture made with various software, music, sound, photographs, video data, and the like.

The authoring service control unit 209 may transmit the authoring tool to the user terminal 100, but the user terminal 100 may use the authoring tool while accessing the authoring service control unit 209 in a virtual machine environment.

The license management unit 211 registers and manages the licensing information for all digital contents stored in the database 207.

The license information includes the information specifying the right of use (e.g., number of times, duration, etc.), and if there are digital content and the license information for the digital content, the digital content may be executed in the user terminal 100. That is, the license information represents the right of executing the digital content. For example, the license information determines approval of the content download, approval of content reproduction, approval of content copying, and the like.

The license management unit 211 manages license information for each digital content stored in the database 207, and registers the license information for the self-made digital content on the basis of the information that is input from the user terminal 100.

In this case, the license management unit 211 registers as integration license information for the self-made digital content combining the license information of the original digital content for the self-made digital content and the license information of the self-made digital content. Here, the license management unit 211 calculates ratio information of the original digital content portion to a portion created using the authoring tools for the self-made digital content, and records the calculated ratio information in the integration licensing information.

The content management unit 213 receives the self-made digital content from the user terminal 100 to convert the received self-made digital content in a format designed by the user terminal 100, and then converts into a digital rights management (DRM) content to store in the database 207.

The content management unit 213 receives the user policy information for the self-made digital content from the user terminal 100 and manages it by mapping with the self-made digital content.

The user policy information includes the content information, the sales policy information, and the marketing policy information. The content information includes the information of the self-made digital content itself. The sales policy information includes a billing policy, a price, a billing history, and the like of the self-made digital content. The marketing policy information includes buyer type, promotions, and the like.

The media conversion unit 215 converts the self-made digital content into the media to be suitable for the media format that the user terminal 100 requests to transfer to the content management unit 213. The media format may be a media type, the execution environment of the contents, the operating system (OS), and the like.

The content management unit 213 provides selection items of a plurality of media formats to the user terminal 100 through the portal service unit 203, and may request the media conversion unit 215 to convert the self-made digital content into the selected media format.

The DRM conversion unit 217 converts the self-made digital content created by the user terminal 100 into the DRM content to transfer the converted content to the content management unit 213.

The DRM conversion unit 217 encrypts the self-made digital content, and may perform content packaging on the basis of a rights object (RO) to use the encrypted DRM Contents Format (DCF) and the corresponding content.

The RO includes a content encryption key (CEK) used at the time of encrypting the self-made digital content, the number of times of content reproduction included in the acquired license information from the license management unit 211, and RO/restriction information made of meta-information such as content ID. Particularly, the CEK and RO/restriction information corresponding to a different secret value for each content are important information that should be protected so that no unauthorized user or terminal can add/delete/amend the content. Therefore, the CEK is encrypted and transferred so that only the authorized user or terminal has access thereto.

The content provision unit 219 acquires the license information for the self-made digital content from the license management unit 211 to provide the self-made digital content based on the license information.

The content provision unit 219 provides the user interface capable of trading the self-made digital content, wherein the trade includes the purchase and pay-per-use service.

The content provision unit 219 performs the trade for the self-made digital content according to the license information for the self-made digital content received from the license management unit 211 and the user policy information stored in the database 207 when the trade for the self-made digital content is required.

A content provision server (not shown) provides the DRM content and RO stored in the database 207 to the user terminal 100 through the content management unit 213 when the download of any self-made digital content is required from the user terminal 100.

The download request may be a request of the user terminal 100 that creates the self-made digital content. In addition, the download request may be a request of the user terminal 100 that completes the payment for the purchase or pay-per-use.

In the case in which the download request is the pay-per-use request, the RO may be added with the pay-per-user information (the duration, the number of times, and the executable terminal) by the content provision server (not shown).

In addition, the content provision unit 219 manages author information of the original content for the self-made digital content and author information of the self-made digital content. The management information includes financial information such as identification number (ID) information, account to be able to deposit the proceeds, cash information, and the like.

The content provision unit 219 receives the integration license information for the self-made digital content from the license management unit 211, and distributes trading profit to the author of the original content and the author of the self-made digital content according to the ratio information included in the integration license information. The content provision unit 219 may distribute the trading profit in an online cash type capable of purchasing the self-made digital content to the author of the original content and to the author of the self-made digital content.

An authoring service method based on the described content will now be described according to an exemplary embodiment.

The authoring service is divided into a resale content registration process, an authoring service process, and a trade process, and each process will be described. In addition, the authoring service will be described with reference to the constitution of FIG. 1 to FIG. 3, and the same reference numerals will be used to denote analogous elements.

Figure 4A:
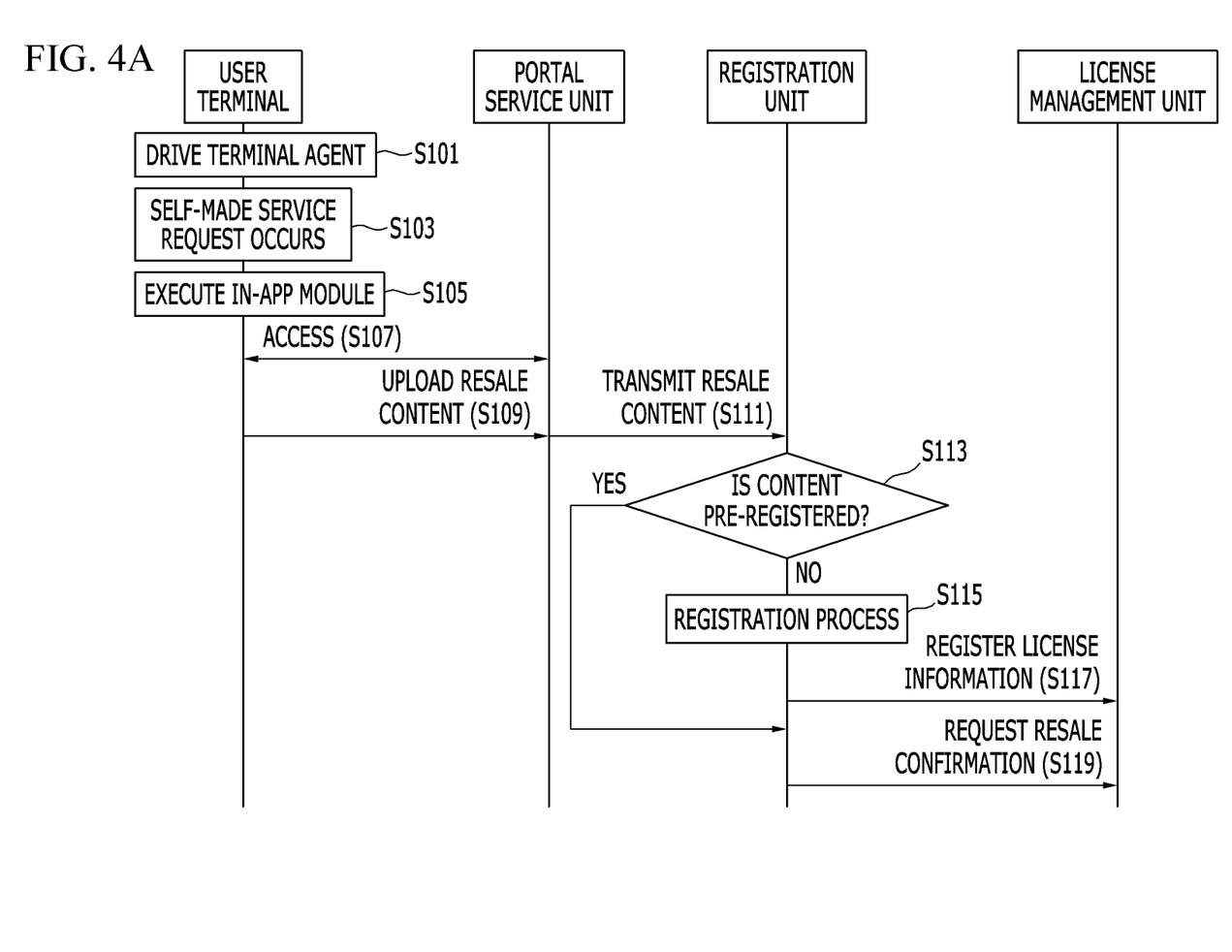
FIGS. 4A and 4B are flowcharts showing a method of registering the resale content according to an exemplary embodiment.
Figure 4B:
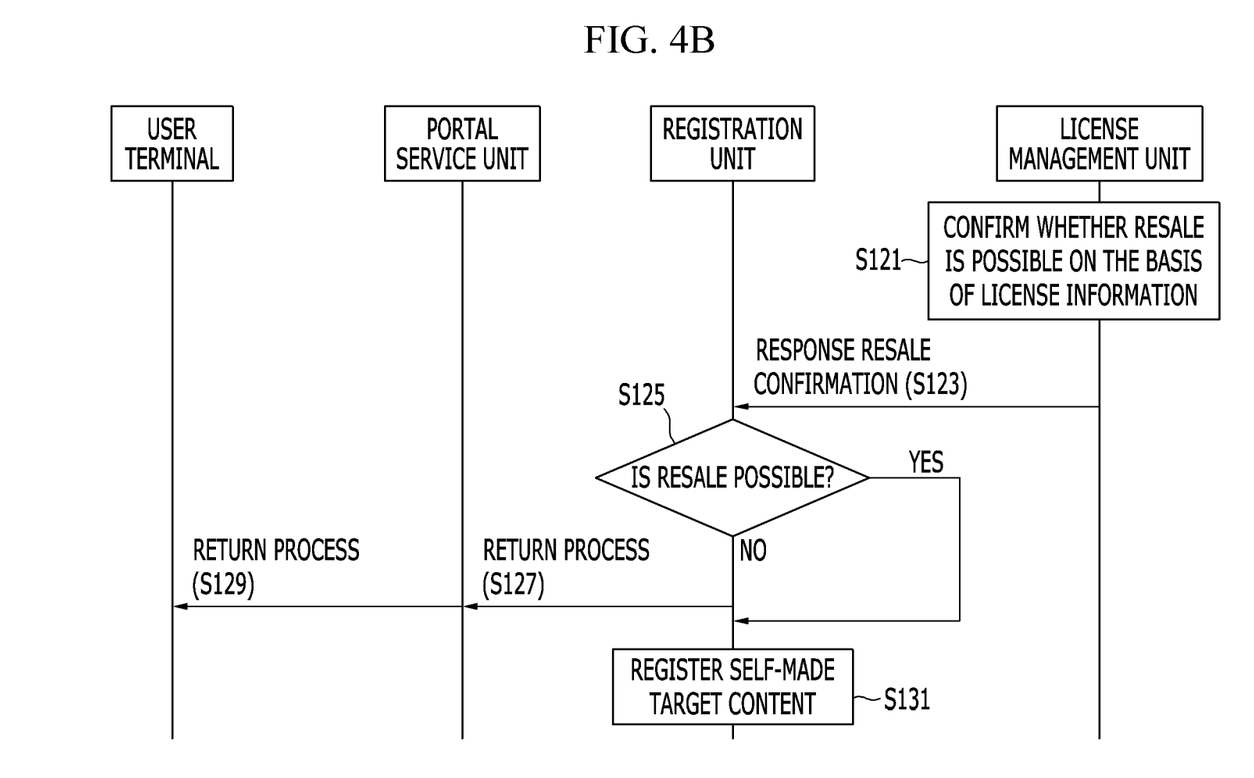

FIGS. 4A and 4B are flowcharts showing the process of registering the resale content according to an exemplary embodiment.

Referring to FIG. 4A, the user terminal such as the user terminal 100 is in a state in which the terminal agent 103 is executed (operation S101). In this state, the authoring service request occurs (in operation S103). For example, the terminal agent 103 executes the in-app module 101 (in operation S105). Operation S103 may be performed in the case in which the user selects the authoring service item in a terminal menu that the terminal agent 103 provides.

The in-app module 101 accesses the portal service unit such as the portal service unit 203 through the in-app module linking unit 201 (in operation S107) to upload the content to be resold (in operation S109).

The portal service unit 203 transmits the resale content uploaded in operation S109 to the registration unit such as the registration unit 205 (in operation S111).

The registration unit 205 determines whether the received resale content is pre-registered content (in operation S113).

In the case in which the resale content is not the pre-registered content (no in operation S113), the registration unit 205 performs a registration process (in operation S115). The registration process includes both a process of receiving the content information and the license information for the resale content from the user terminal 100 and a process of obtaining the license information from an external server using the information included in the resale content.

As described above, when the registration process is completed, the registration unit 205 registers the license information of the resale content to the license management unit such as the license management unit 211 according to an exemplary embodiment (in operation S117).

The registration unit 205 requests confirmation of whether the resale of the resale content is possible to the license management unit 211 (in operation S119) after determining that it is pre-registered content in operation S113 or registering the license information in operation S117.

As shown in FIG. 4B, the license management unit 211 confirms the license information for the corresponding content to confirm whether the resale is possible (in operation S121), and returns the confirmation results to the registration unit 205 (in operation S123).

Then, the registration unit 205 determines whether the resale is possible on the basis of the results received at operation S123 (in operation S125), and when the resale is impossible, requests to return to the portal service unit 203 (in operation S127).

The portal service unit 203 indicates that the resale of the resale content uploaded in operation S109 is impossible to the user terminal 100 and performs the return process (in operation S129). For example, the uploaded resale content may be retransmitted.

In addition, the registration unit 205 determines whether the resale is possible on the basis of the results received in operation S123 (in operation S125), when the resale is possible, registers the resale content received in operation S111 as the authoring target content (in operation S131). That is, the resale content is registered in the database 207 and is provided as content to be created using the authoring tool.

Figure 5A:
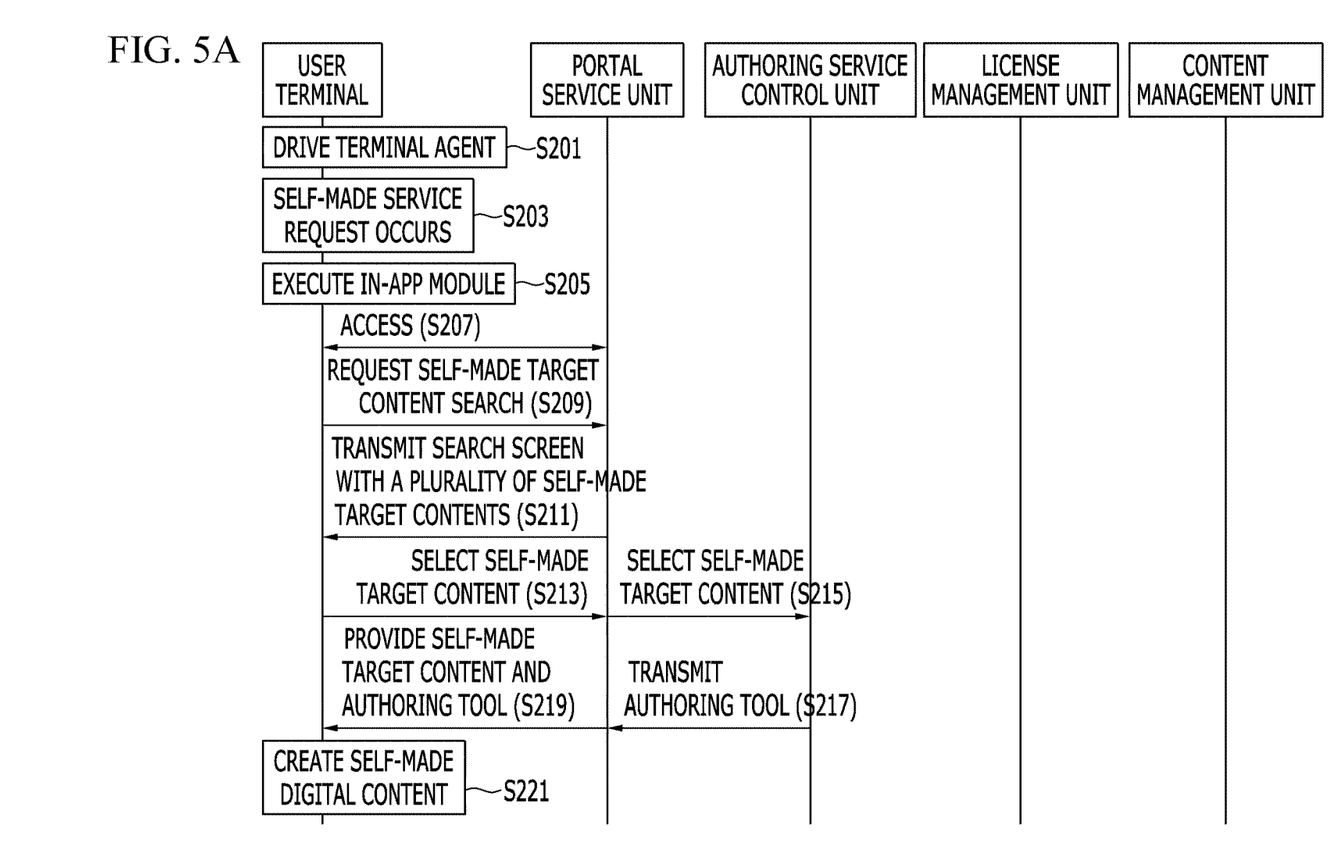
FIGS. 5A and 5B are flowcharts showing a method of authoring service according to an exemplary embodiment.
Figure 5B:
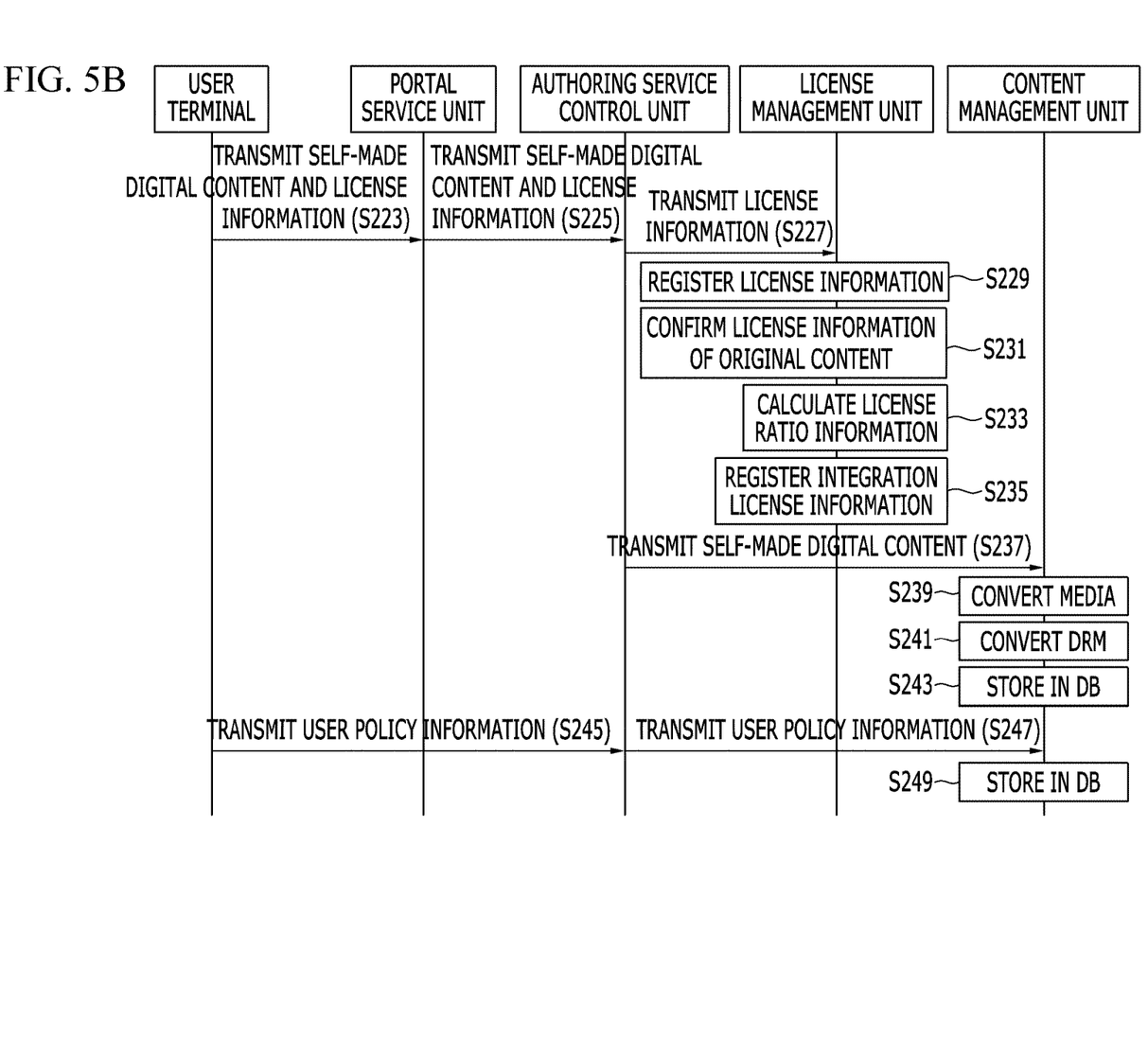

FIGS. 5A and 5B are flowcharts showing the process of an authoring service according to an exemplary embodiment.

Referring to FIG. 5A, the user terminal such as the user terminal 100 is in a state in which it executes the terminal agent 103 (in operation S201). In this state, the authoring service request occurs (in operation S203). Then, the terminal agent 103 executes the in-app module 101 (in operation S205).

The in-app module 101 accesses the portal service unit such as the portal service unit 203 through the in-app module linking unit such as the in-app module linking unit 201 (in operation S207) to request the search of the authoring target content (in operation S209). In this case, the portal service unit 203 may provide a search screen capable of searching the authoring target content by category or keyword input when the in-app module 101 accesses. Then, the in-app module 101 may search the user-desired authoring target content through the search screen.

When the search is requested from the in-app module 101, the portal service unit 203 searches the database 207 to transmit the search screen on which a plurality of authoring target contents are arranged (in operation S211).

The user terminal 100 outputs the search screen received in operation S211 on the display such as the display unit 105 and transmits the authoring target content selection information to the portal service unit 203 (in operation S211) when the user selects the authoring target content through the input unit 105. The portal service unit 203 transmits the authoring target content selection information to the authoring service control unit such as the authoring service control unit 209 (in operation S215).

The authoring service control unit 209 transmits the corresponding authoring tool to the portal service unit 203 (in operation S217) according to the authoring target content selection information.

The portal service unit 203 transmits the authoring tool received in operation S217 and the authoring target content selected in operation S211 to the user terminal 100. In operation S219, the user terminal 100 may receive the authoring tool under the virtual machine environment provided by the authoring service control unit 209 in a state in which the user terminal 100 is connected to the authoring service control unit 209.

The user terminal 100 creates the authoring target content provided in operation S219 to new content, that is, self-made digital content, using the authoring tool (in operation S221). As shown in FIG. 5B, the user terminal 100 transmits the created self-made digital content and the license information that the user inputs for the self-made digital content to the portal service unit 203 (in operation S223).

The authoring service control unit 209 receives the self-made digital content and the license information through the portal service unit 203 (in operation S225) to transfer the license information to the license management unit such as the license management unit 211 (in operation S227).

The license management unit 211 registers the license information received in operation S227 (in operation S229).

The license management unit 211 confirms the license information for the original digital content of the self-made digital content (in operation S231). The license management unit 211 calculates a ratio information of the original digital content portion to a portion created using the authoring tools, for the self-made digital content (in operation S233). The portion created using the authoring tool is confirmed through the authoring service control unit 209.

Then, the license management unit 211 generates integration license information for the self-made digital content combining the license information of the original digital content for the self-made digital content and the license information of the self-made digital content, and registers the generated integration license information as the license information of the self-made digital content (in operation S235). The license management unit 211 includes the ratio information calculated in operation S233 in the integration license information.

In addition, the authoring service control unit 209 transfers the self-made digital content received in operation S227 to the content management unit 211 (in operation S237).

The content management unit such as the content management unit 213 is connected with the media conversion unit 215 to convert the self-made digital content into the media (in operation S239).

In operation S223, the user terminal 100 may designate the media conversion format to convert the self-made digital content suitable for the media conversion format. For example, if the media format, the OS of the execution environment, and the like are designated, the user terminal 100 converts the self-made digital content.

The content management unit 213 is connected with the DRM conversion unit 217 to convert the self-made digital content that is converted into the media into the DRM content (in operation S241), and then stores the converted content in the database 207 (in operation S243).

The user terminal 100 may register the user policy information for the self-made digital content to the content management unit 211 through the portal service unit 203 (in operations S245 and S247). The content management unit 213 maps the user policy information received in operation S247 together with the DRM content converted in operation S241 to store it in the database 207 (in operation S243).

Figure 6A:
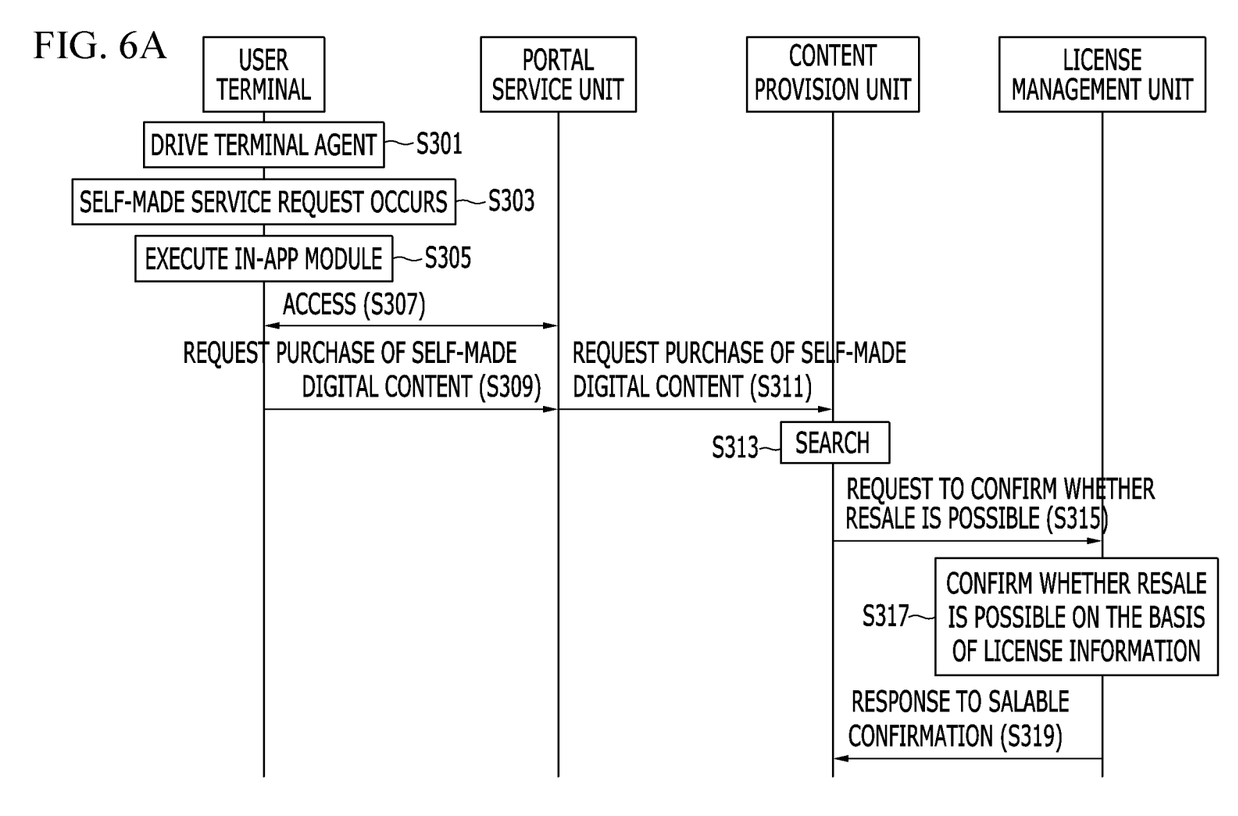
FIGS. 6A and 6B are flowcharts showing a method of trading of an authoring digital content according to an exemplary embodiment.
Figure 6B:
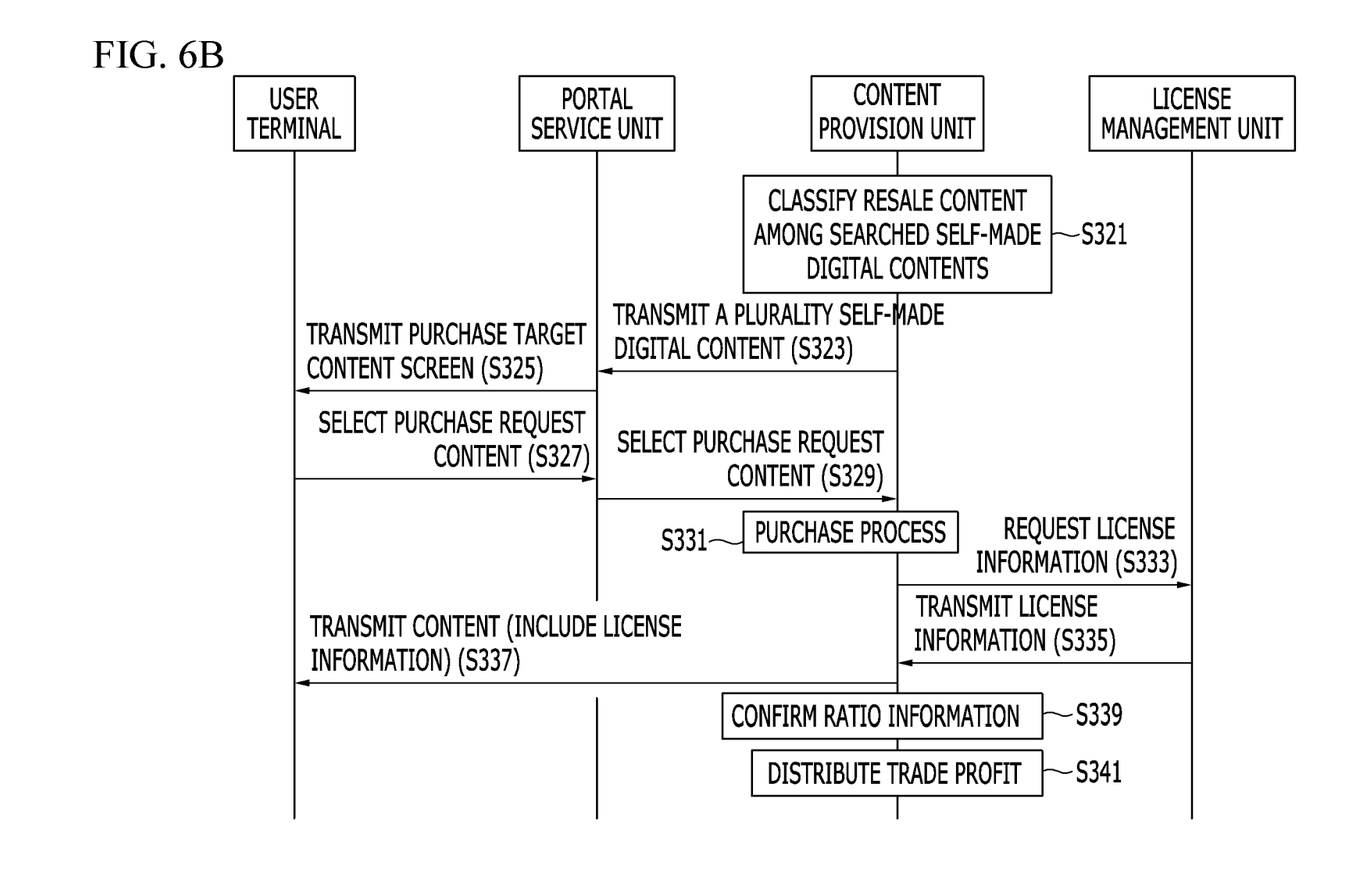

Next, FIGS. 6A and 6B are flowcharts showing the trading process of an authoring digital content according to an exemplary embodiment.

Referring to FIG. 6A, the user terminal such as the user terminal 100 is in a state in which the terminal agent 103 is executed (in operation S301). In this state, the authoring service request occurs (in operation S303). The terminal agent 103 then executes the in-app module 101 (in operation S305).

The in-app module 101 accesses the portal service unit such as the portal service unit 203 through the in-app module linking unit 201 (in operation S307) to request the purchase of the self-made digital content (in operation S309). In this case, the portal service unit 203 may provide the search screen capable of searching the authoring target content by category or keyword input when the in-app module 101 accesses. Then, the in-app module 101 may search the user-desired authoring digital content through the search screen.

The portal service unit 203 transfers the purchase request received from the in-app module 101 to the content provision unit such as the content provision unit 219 (in operation S311).

The content provision unit 219 searches the database 207 (in operation S313) and extracts the self-made digital content requested for purchasing from the user terminal 100 to request to confirm whether the sale is possible to the license management unit such as the license management unit 211 (in operation S315).

The license management unit 211 confirms whether the resale is possible on the basis of the license information (in operation S317) to return the confirmation results to the content provision unit 219 (in operation S319).

As shown in FIG. 6B, the content provision unit 219 classifies the salable contents in the self-made digital content searched in operation S313 according to the confirmation results received in operation S319 (in operation S321). The content provision unit 219 transmits a plurality of sellable self-made digital contents to the portal service unit 203 (in operation S323).

Then, the portal service unit 203 transmits the purchase target content search screen on which the plurality of salable self-made digital contents received in operation S323 are arranged to the user terminal 100 (in operation S325).

The user terminal 100 outputs the purchase target content search screen received in operation S325 on the display when the user selects the self-made digital content through the input unit 107, and transmits the purchase request content selection information to the portal service unit 203 (in operation S327).

The content provision unit 219 receives the purchase request content selection information from the portal service unit 203 (in operation S329) to perform the purchase process (in operation S331). The purchase process confirms the user policy information of the self-made digital content and provides a billing page on which the billing information is displayed to the user terminal 100, and when the information to agree with the billing is received from the user terminal 100, all processes performing the billing and payment are included in the purchase process. The billing and payment may be done through cash payment for the authoring service, mobile payment, credit card payment, account transfer, and the like.

When the purchase process is completed, the content provision unit 219 obtains the license information for the self-made digital content of which the purchase is completed from the license management unit 211 (in operations S333 and S335). The content provision unit 219 transmits the self-made digital content of the completed purchase and the license information to the user terminal 100 (in operation S337). In operation S337, the DRM converted digital content and RO may be transmitted.

Meanwhile, the content provision unit 219 confirms the ratio information between the author of the original content and the author of the self-made digital content on the basis of the license information received in operation S335 (in operation S339).

Then, the content provision unit 219 distributes the trading profit of the self-made digital content to the author of the original content and the author of the self-made digital content according to the ratio information (in operation S341).

In this case, the distribution may be made of various financial processing methods using the information of the author of the original content registered in advance and the author of the self-made digital content.

Here, according to an exemplary embodiment, the trading profit may be distributed to the author of the original content and the author of the self-made digital content in an online cash type capable of purchasing the self-made digital content.

At least some function of the authoring service system 200 according to an exemplary embodiment is implemented in the hardware or may be implemented in the software combined with the hardware.

In this configuration, the authoring service system 200 combined with the computer system will be described in detail with reference to FIG. 7 according to an exemplary embodiment.

Figure 7:
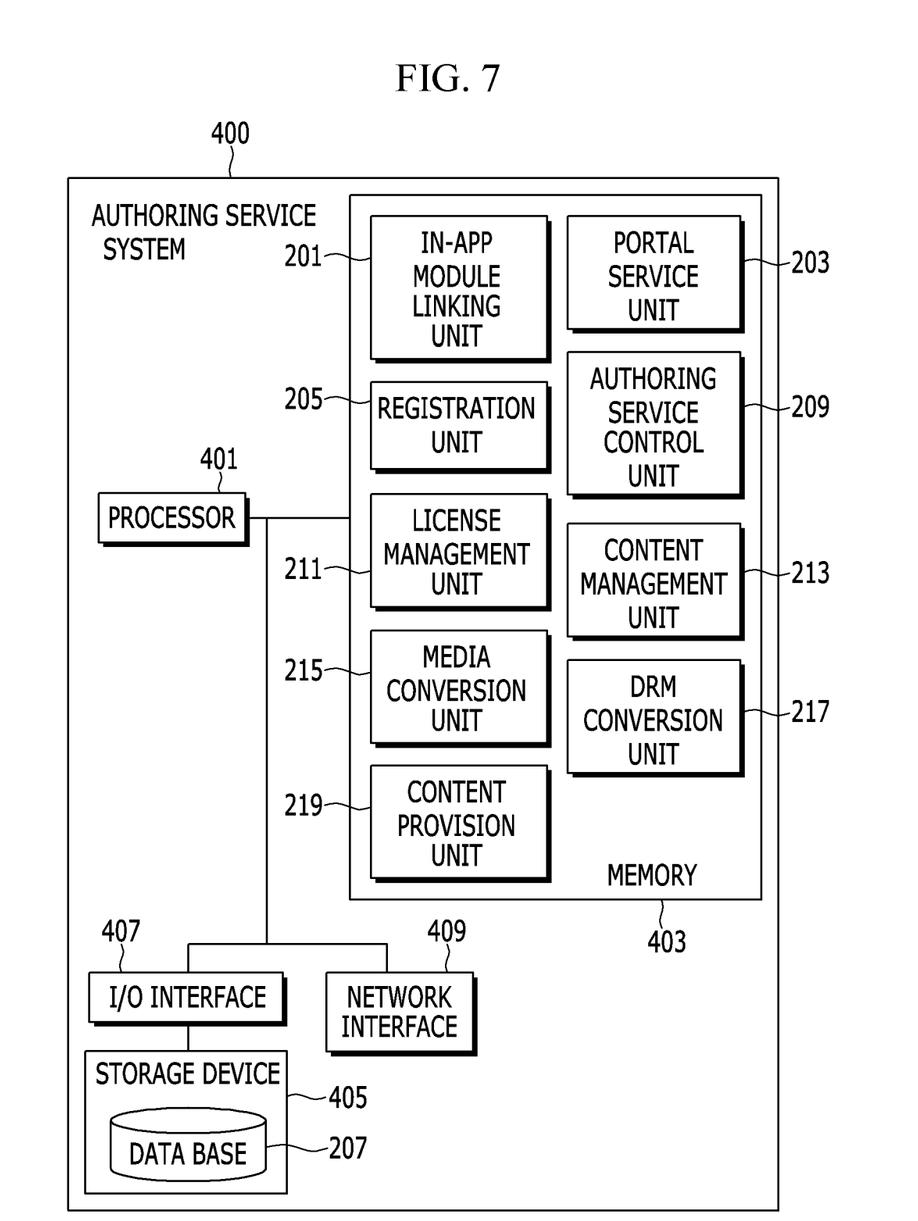
FIG. 7 is a schematic diagram of an authoring service system according to another exemplary embodiment.

FIG. 7, which is a schematic diagram of an authoring service system according to another exemplary embodiment, shows a system capable of performing at least some function of an in-app module linking unit 201, a portal service unit 203, a registration unit 205, an authoring service control unit 209, a license management unit 211, a content management unit 213, a media conversion unit 215, a DRM conversion unit 217, and a content provision unit 219, as in FIG. 3 by way of an example.

Referring to FIG. 7, the authoring service system includes a processor 401, a memory 403, at least one storage device 405, an input/output (I/O) interface 407, and a network interface 409.

The processor 401 may be implemented by a central processing unit (CPU), another chipset, a microprocessor, and the like, and the memory 403 may be implemented by a RAM such as a dynamic random access memory (DRAM), a rambus DRAM (RDRAM), a synchronous DRAM (SDRAM), a static RAM (SRAM), or the like.

The storage device 405 may be implemented by an optical disc such as a hard disk, a compact disk read only memory (CD-ROM), a CD rewritable (CD-RW), a digital video disk ROM (DVD-ROM), a DVD-RAM, a DVD-RW disc, a blue-ray disc, and the like, a flash memory, or a permanent or volatile storage device such as various other types of RAM.

In addition, the I/O interface 407 may allow the processor 401 and/or the memory 403 to access the storage device 405, and the network interface 409 may allow the processor 401, and/or memory 403 to access the network 300.

In this case, the processor 401 loads program commands to implement at least some function of the in-app module linking unit 201, the portal service unit 203, the registration unit 205, the authoring service control unit 209, the license management unit 211, the content management unit 213, the media conversion unit 215, the DRM conversion unit 217, and the content provision unit 219 into the memory 403, and may control so that the operation described with reference to FIG. 3 is performed.

In addition, the storage device 405 is connected with the processor 401 and may allow the function of the database 207 to be performed.

As shown in FIG. 7, the processor 401, the memory 403, the storage device 405, the I/O interface 407, and the network interface 409 may be implemented in a single computer or may be implemented in a plurality of computers in a distributed scheme.

While exemplary embodiments have been described above, it is understood that an inventive concept is not limited to the disclosed exemplary embodiments, but, on the contrary, is intended to cover various modifications and equivalent arrangements included within the spirit and scope of the appended claims and their equivalents. Moreover, various modifications to these exemplary embodiments will be readily apparent to those skilled in the art, and the generic principles and specific examples defined herein may be applied to other exemplary embodiments.

The invention claimed is:

1. An authoring service system, comprising:
at least one memory configured to store program instructions; and
at least one processor configured to read the program instructions and execute the program instructions to implement:
an authoring service controller configured to provide an authoring tool to a user terminal and configured to receive self-made digital content generated using the authoring tool;
a license manager configured to generate integrated license information of the self-made digital content by combining license information of original digital content with license information of a portion generated using the authoring tool, and configured to register the integrated license information of the self-made digital content; and
a content provisioner configured to provision the self-made digital content based on the integrated license information acquired from the license manager,
wherein the integrated license information of the self-made digital content comprises ratio information indicating a ratio of a portion of the original digital content, based upon which the self-made digital content is generated, to the portion generated using the authoring tool, which makes up the self-made digital content,
wherein the content provisioner manages author information of the original digital content and author information of the self-made digital content, and distributes trading profit for the self-made digital content to an author of the original digital content and to an author of the self-made digital content according to the ratio information,
wherein the content provisioner provides a user interface for trading the self-made digital content, when a trade for the self-made digital content is required, and
wherein the content provisioner performs the trade of the self-made digital content according to the integrated license information for the self-made digital content received from the license manager.

2. The authoring service system of claim 1, wherein the at least one processor is further configured to implement:
an in-app module linker configured to access an in-app module,
wherein the in-app module is an application that provides common services in a form in which a component is inserted in an unspecified number of applications which are installed in the user terminal to allow an authoring service to be provided to the user terminal by connecting with the in-app module, the authoring service controller, the license manager, and the content provisioner.

3. The authoring service system of claim 2, wherein the at least one processor is further configured to implement:
a portal server configured to connect with the in-app module via the in-app module linker to select, by searching, target digital content for authoring, and to register the selected authoring target digital content as the self-made digital content using the authoring tool, and to provide to the user terminal, the user interface for trading the self-made digital content,
wherein the selected authoring target digital content is converted into the self-made digital content by using the authoring tool.

4. The authoring service system of claim 1, further comprising:
a database configured to store target digital content for authoring, and
wherein the at least one processor is further configured to implement a registrator configured to receive digital content to be resold and configured to confirm the license information with respect to the digital content to be resold from the license manager to store the digital content to be resold in the database.

5. The authoring service system of claim 4, wherein the registrator determines whether the digital content to be resold is registered in advance, and wherein, when the digital content is not registered, the registrator acquires the license information for the digital content to be resold to register the acquired license information at the license manager, and determines whether the digital content is to be resold.

6. The authoring service system of claim 4, wherein the registrator registers the integrated license information of the self-made digital content.

7. The authoring service system of claim 1, wherein the content provisioner distributes to the author of the original digital content and to the author of the self-made digital content the trading profit in an online cash type based on purchases of the self-made digital content.

8. The authoring service system of claim 1, wherein the at least one processor is further configured to implement:
a content manager configured to receive user policy information from the user terminal and configured to manage the self-made digital content by mapping the self-made digital content to the received user policy information, to provide the self-made digital content and the received user policy information to the content provisioner,
wherein the user policy information comprises content information, sales policy information and marketing policy information for the self-made digital content.

9. The authoring service system of claim 8, wherein the content provisioner performs the trade of the self-made digital content according to the integrated license information and the user policy information received from the content manager.

10. The authoring service system of claim 1, wherein the at least one processor is further configured to implement:
a digital rights management (DRM) converter configured to convert the self-made digital content received from the authoring service system into digital rights management (DRM) content to transfer the converted digital content to a content manager.

11. The authoring service system of claim 1, wherein the at least one processor is further configured to implement:
a media converter configured to covert the self-made digital content into a media suitable for a conversion format requested by the user terminal from the authoring service controller, and configured to transfer the converted self-made digital content to a content manager.

12. An authoring service method comprising:
providing an authoring tool to a user terminal;
generating self-made digital content by the user terminal using the provided authoring tool; and generating integrated license information of the self-made digital content by combining license information of original digital content with license information of a portion generated using the authoring tool and providing the integrated license information for the generated self-made digital content to an authoring service system to register the integrated license information with the generated self-made digital content, wherein the authoring service system distributes the generated self-made digital content to at least one other user terminal based on the integrated license information, wherein the integrated license information of the self-made digital content comprises ratio information indicating a ratio of a portion of original digital content, based upon which the self-made digital content is generated, to a portion generated using the authoring tool, which makes up the self-made digital content, wherein a content provisioner of the authoring service system manages author information of the original digital content and author information of the self-made digital content, and distributes trading profit for the self-made digital content to an author of the original digital content and to an author of the self-made digital content according to the ratio information, and provides a user interface for trading the self-made digital content, when a trade for the self-made digital content is required, and wherein the content provisioner performs the trade of the self-made digital content according to the integrated license information for the self-made digital content received from a license manager of the authoring service system.

* * * * *